United States Patent
Korneluk et al.

(10) Patent No.: US 6,477,368 B1
(45) Date of Patent: Nov. 5, 2002

(54) METHOD FOR DYNAMIC TRANSMITTER TRAINING FOR A SHARED COMMUNICATION SYSTEM UTILIZING DYNAMIC CHANNEL ALLOCATION

(75) Inventors: Jose E. Korneluk, Boynton Beach, FL (US); Douglas A. Lenz, Coral Springs, FL (US); Anil N. Patel, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/560,782

(22) Filed: Apr. 28, 2000

(51) Int. Cl.[7] .............................................. H04Q 7/20
(52) U.S. Cl. ...................................... 455/423; 455/425
(58) Field of Search .......................... 455/69, 452, 522, 455/423, 424, 425; 370/337, 347, 503; 375/130, 140, 224, 259

(56) References Cited

U.S. PATENT DOCUMENTS

| | | | |
|---|---|---|---|
| 5,066,923 A | * 11/1991 | Gailus et al. ................ 330/107 |
| 5,559,807 A | * 9/1996 | Van den Heuvel et al. 370/95.3 |
| 5,675,286 A | 10/1997 | Baker et al. ................. 330/129 |
| 5,990,734 A | * 11/1999 | Wright et al. ................... 330/2 |
| 6,054,896 A | * 4/2000 | Wright et al. ................ 330/149 |

* cited by examiner

Primary Examiner—Daniel Hunter
Assistant Examiner—Tuan Tran
(74) Attorney, Agent, or Firm—Scott M. Garrett

(57) ABSTRACT

A method utilizes a training monitoring algorithm to control when full training of a transmitter of a shared communication system that utilizes dynamic channel allocation occurs. Full training of the transmitter occurs during an initial transmission slot of a training interval that is used to request allocation of fixed communication resources of the communication system or when operating conditions of the transmitter, such as power and frequency, change. The duration of the training interval is dynamically controlled by manipulation of full-power and cut-back power training interval counters.

12 Claims, 10 Drawing Sheets

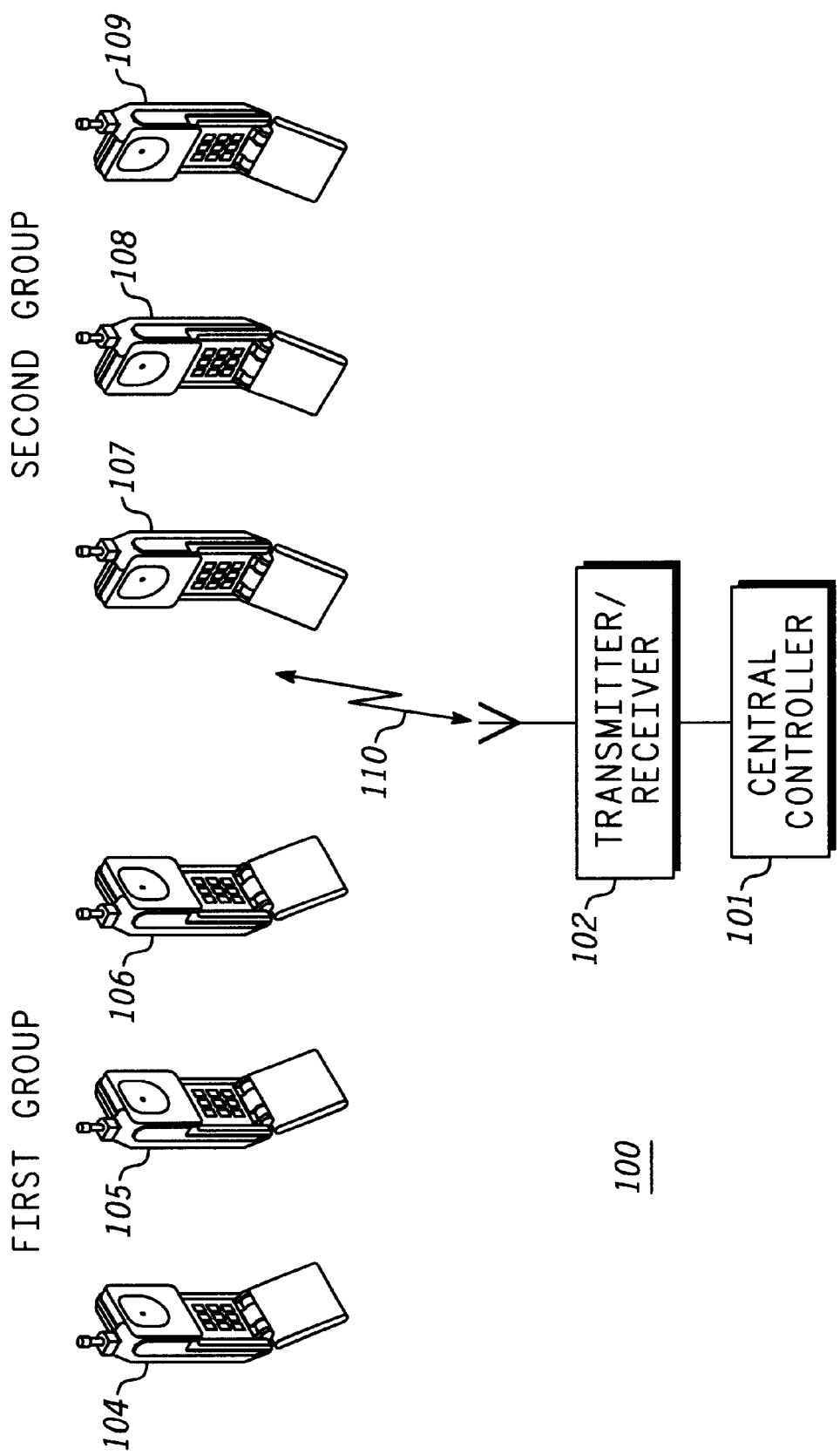

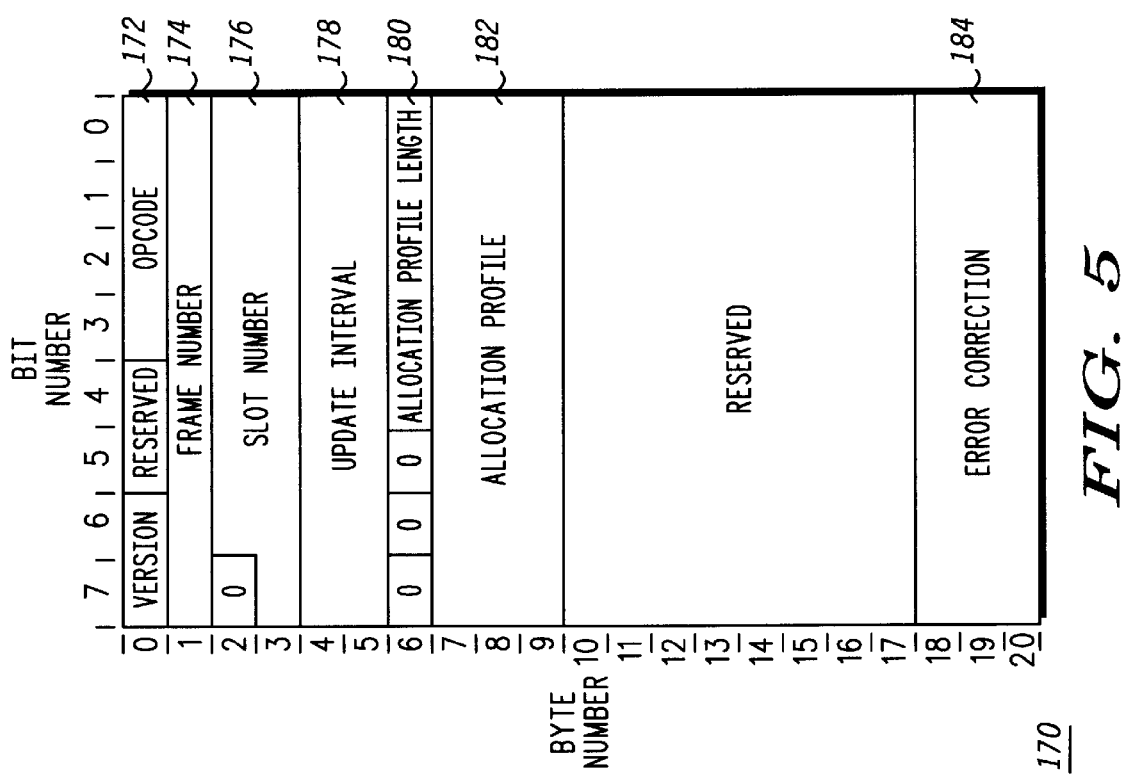

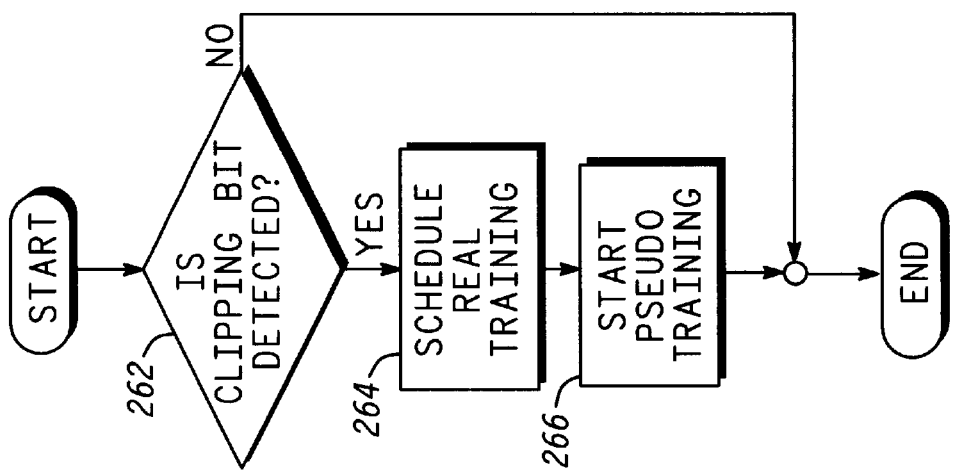
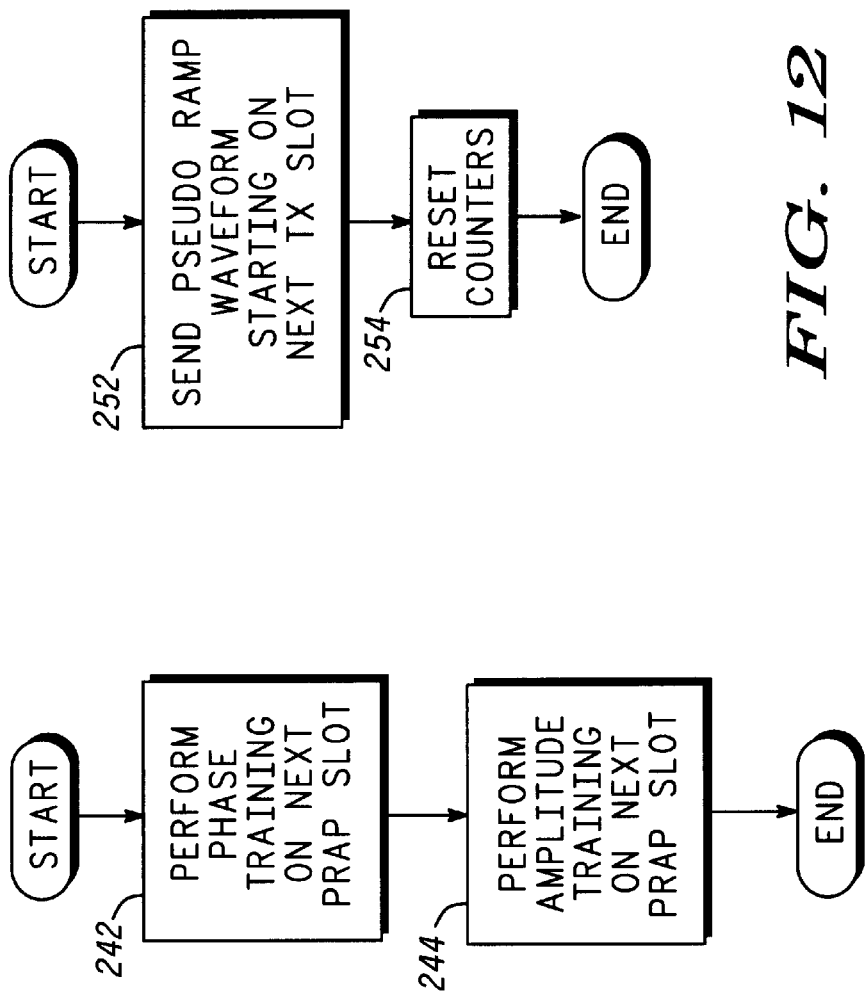

METHOD FOR DYNAMIC TRANSMITTER TRAINING FOR A SHARED COMMUNICATION SYSTEM UTILIZING DYNAMIC CHANNEL ALLOCATION

FIELD OF THE INVENTION

The present invention relates generally to shared communication systems, and, in particular, to the training of transmitters of such shared communication systems that are capable of near-continuous transmission of data.

BACKGROUND OF THE INVENTION

Shared communication systems in which a communication resource, also known as a communication link, is used to support more than one type of communication service are known in the art. One example of such a shared communication system is the Time Division Multiplexed (TDM) communication system designed to support multiple services, such as voice communication services, circuit-switched data communication services, and packet-switched data communication services. In a TDM system, the communication resource is divided into a number of time portions of specified length, called time slots. A given communication service may then be assigned a specified portion of the available time slots, while other time slots may be assigned to other services.

Radio frequency (RF) transmitters are an integral part of shared communication units and systems, forming parts of subscriber units and base stations of shared communication systems, for instance. RF transmitters must be tested to ensure that proper, linear operation is maintained over changes in frequency, power, and transmission rate. In the present embodiment, so-called "RF training" of an RF transmitter, which includes phase and amplitude training, is thus performed regularly during a training interval of the transmitter to ensure that linear operation of the transmitter is maintained over changes in power, frequency, and temperature in the operating environment of the transmitter.

The advent of packet data in shared communication systems, such as the iDEN (integrated Digital Enhanced Network) communication system manufactured by Motorola, introduced the concept of dynamic channel allocation within a variable frame length. Time slots are dynamically allocated in response to constantly changing system requirements. The best allocation of the shared communication resource or link at any given moment in time is determined and then allocated according to the determination. Since demands on the communication resource are dynamic, the allocation of the resource between competing packet data communication services and devices is changeable over time as well.

Dynamic channel allocation has worked particularly well in TDM interleaved transmission modes, such as 3:1 and 6:1, for instance, in which data is transmitted every three slots or every six slots of a frame, respectively. Since data is only transmitted during a portion of the frame, there is plenty of time within the frame to perform RF training and then to process the results of the training to make any needed corrections to the RF transmitter prior to the next data transmission. With the need to transmit data in a near-continuous manner, such as in a 6:6 transmission mode in which data is transmitted every slot of a six-slot frame, however, the RF transmitter may transmit for an extended period of time in 6:6 mode without an opportunity to perform RF training. Since there is not enough time to process the training results of the previous slot before transmission occurs again, the result is degraded transmitter performance.

In addition to the concern with how near-continuous transmission by the RF transmitter affects RF training, there are other concerns with RF training. During the phase portion of RF training in which the amount of attenuation to use is determined, the RF power amplifier (RF PA) of the transmitter may saturate and cause RF interference, or "splatter," on adjacent channels. Also, frequent RF training during every slot of the training interval can substantially drain the battery of a portable RF transmitter. These concerns point to a need in the art to be able to control when RF training of an RF transmitter is performed in a manner that overcomes the various shortcomings of the prior art.

BRIEF DESCRIPTION OF THE DRAWINGS

The novel features believed characteristic of the invention are set forth in the claims. The invention itself, however, as well as the preferred mode of use, and objects and advantages thereof, will best be understood by reference to the following detailed description of an illustrative embodiment when read in conjunction with the accompanying drawing (s), wherein:

FIG. 1 is a block diagram of a TDM wireless shared communication system having a first group and a second group of communication units, in accordance with the present invention.

FIG. 5 illustrates a possible format used in the shared communication system for a data channel update message, in accordance with the present invention.

FIG. 7 is a time line illustrating usage of the data channel update message, in accordance with the present invention

FIG. 11 is a flow chart illustrating the pseudo training, in accordance with the present invention.

FIG. 12 is a flow chart illustrating checking for clipping of the output waveform of the RF transmitter, in accordance with the present invention.

FIG. 13 is a flow chart illustrating a training monitoring algorithm used in the RF transmitter, in accordance with the present invention.

DETAILED DESCRIPTION OF THE INVENTION

Figure 3:
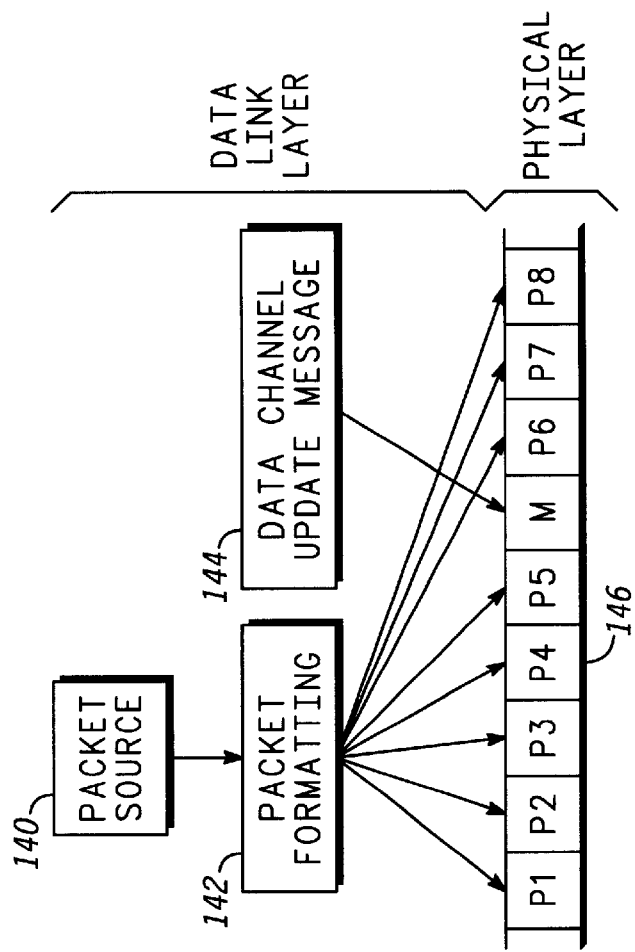
FIG. 3 illustrates a possible implementation of a data channel used in the shared communication system based on the so-called Open System Interconnection (OSI) model, in accordance with the present invention.

While this invention is susceptible of embodiment in many different forms, there are shown in the drawings and will herein be described in detail specific embodiments, with the understanding that the present disclosure is to be considered as an example of the principles; of the invention and not intended to limit the invention to the specific embodiments shown and described. In the description below, like reference numerals are used to describe the same, similar or corresponding parts in the several views of the drawings.

The present invention provides for adaptive training of transmitters used in shared communication systems that utilize dynamic channel allocation, such as wireless TDM communication systems, in: a manner that allows training of a transmitter to occur in a near-continuous transmission environment, while minimizing the negative effects of battery drainage and RF interference or "splatter" caused by RF training. Due to the increased data transmission rates afforded by modern systems, the training interval of the transmitter and when "real" versus "pseudo" training will occur are dynamically defined.

In recognition that the present invention is concerned with RF training of RF transmitters within a shared communication system using dynamic channel allocation, a shared communication system that utilizes dynamic channel allocation for data transmission is first described and shown in FIGS. 1–7.

Referring to FIG. 1, a block diagram of a TDM wireless communication system having a first group and a second group of communication units is illustrated. As previously noted, TDM is but one example of a shared communication system that uses dynamic channel allocation for transmission of data. The TDM wireless communication system 100 comprises a central controller 101, a base station 102 employing a transceiver, a communication resource 110, and communication units 104–109. Communication units 104–109 participate in communication services by transmitting to or receiving information from the base station 102 via the communication resource 110. The base station 102 is a fixed radio transceiver, such as an iDEN base station manufactured by Motorola, Inc. of Schaumburg, Illinois, that includes apparatus for RF modulation/demodulation and related control and signal processing. The base station 102 executes communication protocols and processing as required to support communication channels established by the central controller 101. Typically, the base station 102 includes interfaces (not shown) to other communication systems, such as the Public Switched Telephone Network (PSTN) or a data network, as required to provide the communication services used by the communication units 104–109.

Although the communication system 100 as shown depicts only a single base station 102 and a single communication resource 110, it is well-known in the art that such a system may include multiple base stations and communication resources. The teachings of the present invention can be applied to any number of communication resources. Likewise, although the central controller 101 is depicted separately from the base station 102, alternate embodiments are possible wherein some. or all of the central controller 101 functions are implemented within the base station 102.

Communication units 104–109 may be mobile or portable radio devices, such as iDEN portable radios by Motorola, Inc. The communication units 104–109 provide wireless access to the communication services provided by the communication system 100. Communication units 104–109 operate either as full-duplex units capable of simultaneous RF transmit and receive functions or as half-duplex units capable of non-simultaneous RF transmit and receive functions. Also, communication units 104–109 typically include user interfaces, not shown but known in the art, such as microphones, speakers, and data device connectors.

The communication units are logically divided into a first group 104–106 of communication units and a second group 107–109 of communication units. The first group 104–106 of communication units will usually require communication services of a first type that requires a fixed-size, periodic allocation of time slots, typically one time slot per time frame, e.g., voice calls, circuit data connections and system control communications. The second group 107–109 of communication units will usually require communication services of a second type that requires varying allocations of time slots, often as many as are currently available, e.g., packet-switched data communications. The division of the communication units 104–109 into two groups is logical only, and any communication unit 104–109 may alternately or simultaneously participate in both groups depending on the particular services each user requires. For example, a specific communication unit 104–109 may place a telephone call and send or receive packet data either consecutively or simultaneously, typically by manipulating a mode control included in the user interface.

Figure 2:
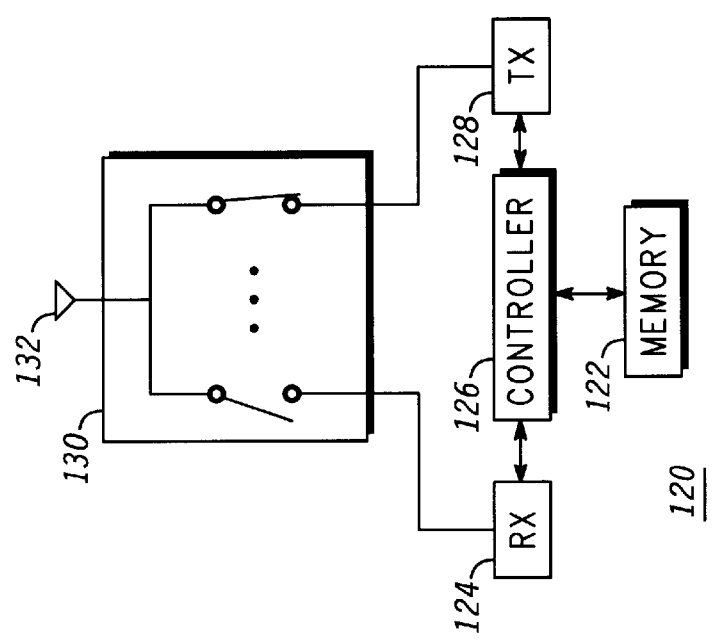
FIG. 2 is a communication unit suitable for use in the shared communication system and having an RF transmitter, in accordance with the present invention.

The transmitters within communication units 107–109, which require varying allocations of time slots for packet-switched data communications, must be subjected to RF training. FIG. 2 illustrates a communication unit 120, such as a subscriber unit, suitable for use in a shared communication system and having an RF transmitter 128. Communication unit 120 operates as a transceiver having a receiver 124 and a transmitter 128, both electrically coupled to antenna 132 via antenna switch 130, as the manner known in the art. Receiver 124 and transmitter 128 are both electrically coupled to controller 126, which may be, for example, a microprocessor that operates unit 120.

Referring back to FIG. 1, base station 102 communicates with the first and second groups of communication units via communication link 110, which may comprise two radio frequency (RF) carriers, one to transmit information inbound from the communication units 104–109 to the base station 102 and another to transmit information outbound from the base station 102 to the communication units 104–109. The communication resource 110 is further divided into a series of time slots which may be further grouped into time frames using known TDM methods. The central controller 101 controls the allocation of time slots on the communication resource 110 for the various communication services supported by the system 100. Central controller 101 allocates time slots differently to the two groups of communication units, as a function of the type of service being provided. The central controller 101 may allocate time slots such that multiple communication channels are formed on the communication resource 110. That is, the central controller 101 may allocate time slots to form one or more voice channels as well as one or more data channels. Thus, the central controller 101 may allocate all of the time slots not currently allocated to voice channels to one or more data channels.

As an example, assume that system 100 uses six time slots per frame. If slots 1, 2, and 5 are currently allocated to three different voice channels for use by the first group 104–106, then slots 3, 4, and 6 in aggregate can form a data channel. As described later, the central controller 101 uses an allocation profile to indicate how the available time slots are allocated at any given time. Thus, the central controller 101 may define, in a first allocation profile, that slot 3 forms a first data channel and, in a second allocation profile, that slots 4 and 6 form a second data channel. For purposes of this discussion, one or more time slots allocated to a communication service is referred to as a communication channel. To provide a communication service of the first type, e.g., a voice call, to one or more communication units in the first group 104–106, the central controller 101 allocates one or more time slots in successive time frames to form a communication channel. This channel is then maintained until the communication service is no longer needed. For a communication service of the second type, e.g., packet data, the central controller 101 allocates one or more time slots to form a data channel.

FIG. 3 illustrates a possible implementation of a data channel based on the so-called Open System Interconnection (OSI) model, described in ISO-7498 of the International Standards Organization, suitable for use in the shared communication system of the present invention. As shown, the present invention is implementable via the data link layer and the physical layer. The data link layer consists of protocols and functions to communicate data across a specific communication link, such as a telephone circuit or an RF communication resource. In wireless communications systems, specific functions included in the data link layer are packet formatting, addressing and channel access protocols. The physical layer consists of electrical and/or mechanical means for communicating information. In a wireless communication system, some of the specific functions included in the physical layer are modulation, demodulation, and channel synchronization. Functions in both the data link layer and the physical layer can be implemented using known hardware and software techniques, or a combination thereof.

Referring to FIG. 3, operation of the present invention at the base station 102 and central controller 101 is shown. A packet source 140 provides data to be transmitted from the central controller 101 to one or more of the communication units in the second group 107–109. Packet formatting 142 produces data packets P1–P8, for example. Note that both the packet source 140 and packet formatting 142 comprise protocols implemented in the data link layer as shown. The data link layer protocols typically add overhead such as packet addresses and control information. Normally, the physical layer protocols process the data packets P1–P8 and transmit them in time slots of a data channel 146. Note that FIG. 3 illustrates the information transmitted in the time slots of data channel 146 only; the time slots of data channel 146 may be any subset of the time slots provided by the communication resource 110. Although the data packets P1–P8 are depicted as being transmitted one per time slot, it is possible that data packets may be long enough to span multiple time slots. In such a case, the data link layer acts to divide data packets into portions such that each portion is transmitted by the physical layer in a time slot of data channel 146.

In addition to packet formatting 142, a data channel update message 144 may be generated from time to time by central controller 101. The generation of this message, for example, might be stimulated by a need to inform the communication units of the second group 107–109 of a change in the allocation profile of data channel 146. When a data channel update message 144 is generated, the data link layer protocol acts to insert the message 144 into the stream of data packets or data packet portions being provided to the physical layer for transmission. Note that the data link layer protocol inserts the data channel update 144 message as opposed to substituting for a data packet or portion thereof. Thus no data packet information is lost when the data channel update message is sent.

To accomplish dynamic channel allocation, base unit 102 receives requests from the communication units 104–109 for resources and then, together with central controller 101, allocates the resources appropriately. Because the packet data channel (PCH) communication resource is based on dynamic channel allocation within a variable frame length, the fixed network equipment (FNE), shown as base station 102 and central controller 101, must tell each communication unit, such as a subscriber unit (SU), how many slots it is allowed to transmit in each frame. This information is contained in the data channel update message in the PCH at the beginning of every frame. The SU communication unit can transmit for any number of frames, as allocated by the FNE, until it has no more data to transmit.

Figure 4:
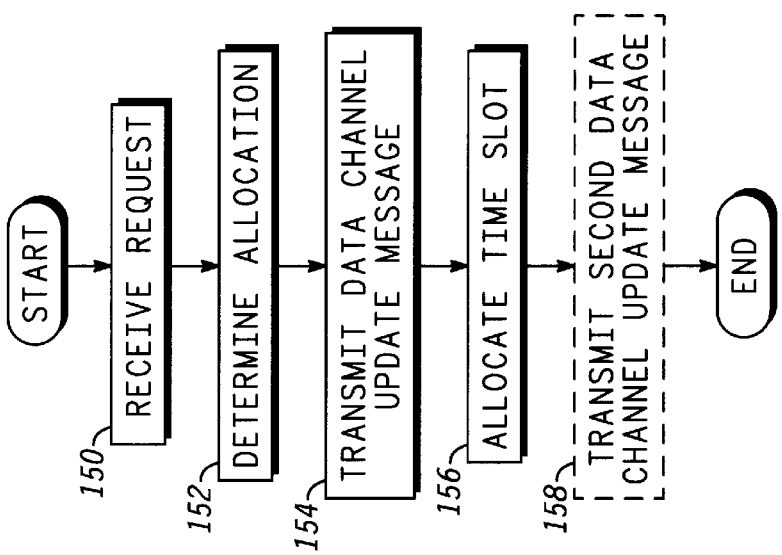
FIG. 4 is a flow chart for use in describing a central controller used in the shared communication system, in accordance with the present invention.

Referring now to FIG. 4, a flow chart of a first embodiment for use in the central controller 101 is shown; the flow chart can be implemented as a computer program stored in memory or other computer-readable medium and executed by a microprocessor, or other suitable processing means, within the central controller 101. At Block 150, base station 102 receives a request from a communication unit of the first group 104–106 to participate in a communication service of the first type, such as group dispatch calls, telephone interconnect calls, and circuit switched data connections, that requires allocation of a fixed number of time slots, typically one time slot per frame; additionally, it is noted that the communication units 107–109 of the second group may request allocation of available resources at this time. At Block 152, central controller 101, in response to the request at Block 150 and using techniques known in the art, determines which time slot(s) will be allocated to fulfill the request. Assuming that the time slots chosen to fulfill the request are currently allocated to the data channel, the central controller 101 formats a data channel update message (such as data channel update message 144 of FIG. 3). At Block 154, the data channel update message is transmitted, via the base station 102, to the communication units in the second group 107–109.

FIG. 5 illustrates a possible format for a data channel update message. The data channel update message 170 comprises a current frame number 174 and a time slot number 176 which are included to provide synchronization for the receiving communication units of the second group 107–109. An allocation profile 182 is included to indicate which of the time slots will be allocated to the data channel following transmission of the data channel update message 170. The allocation profile is preferably provided in the form of a variable-length bitmap, where each bit indicates the status of a corresponding time slot. When a bit in the bitmap is set (a binary 1 value), the corresponding time slot is allocated to the data channel. When a bit in the bitmap is clear (a binary 0 value), the corresponding time slot is not allocated to the data channel. An allocation profile length 180, also provided in the data channel update message 170, indicates the length of the repeating pattern of allocated time slots, typically one frame. An update interval 178 expresses a period of time, as a number of overall time slots, or alternatively, data channel time slots only, until the next data channel update message will be transmitted. The calculation of the update interval 178 is described below. Finally, the data channel update message 170 includes such control fields 172, 184 as necessary for communication units in the second group 107–109 to properly decode the data channel update message.

Referring back to FIG. 4, following transmission at block 154 of the data channel update message, the central controller 101 allocates the time slot to the requesting communication unit from the first group 104–106 at Block 156; note that if the requesting communication unit is from the second group 107–109, then the central controller 101 allocates the time slot to the requesting communication unit of that group. Thus, the requesting communication unit is free to use the allocated time slot in accordance with the requested service. At Block 158, a second data channel update message is optionally transmitted following the expiration of the update interval sent in the first data channel update message. The second data channel update message may also contain an update interval, after which another data channel update message may be transmitted. This process of recurring data channel update messages may continue indefinitely.

It is anticipated that a second data channel update message will not be transmitted in some cases. In these cases, the update interval of the first data channel update message might be a reserved code indicating that no second data channel update message has been scheduled for transmission. If the condition of the communication system changes during the interval between the transmission of the first data channel update message at Block 154 and the transmission of the second data channel update message at Block 158, the allocation profile of the second data channel update message may be changed accordingly. For example, if another request from a communication unit in the first group were received, the allocation profile of the second data channel message may indicate a smaller number of time slots to be allocated to the data channel in the manner previously described. Alternatively, if prior established communication services, such as telephone calls, have ended, the time slots allocated to these calls may be included in the new allocation profile of the data channel of the second data channel update message.

A special case occurs when the central controller 101 determines that the allocation profile of the data channel should be changed as described above, but a half-duplex communication unit of the second group 107–109 is transmitting when the second data channel update message is to be transmitted. Since a half-duplex communication unit that is transmitting would not be capable of receiving the second data channel update message, the allocation profile is not immediately changed. Instead, the second data channel update message is transmitted without a change in the allocation profile. The update interval included in the second data channel update message is set such that the allocation profile may be changed in a subsequent data channel update message after the transmission of the half-duplex communication unit is completed.

Figure 6:
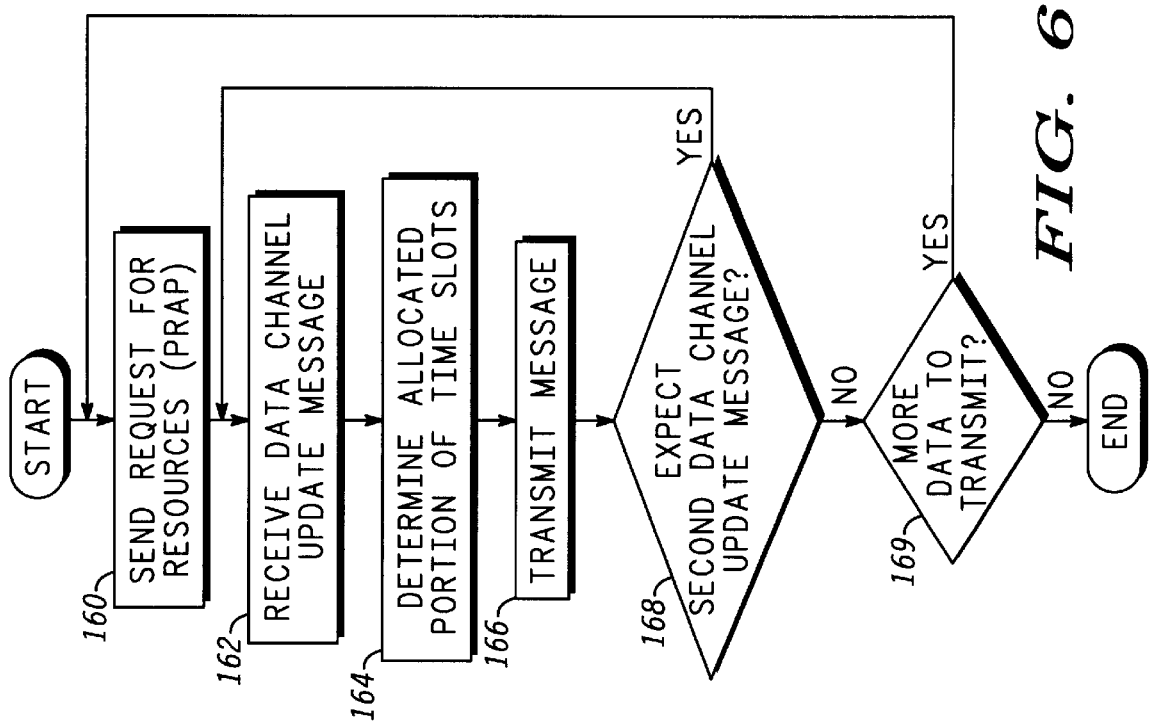
FIG. 6 is a flow chart for use in describing a communication unit used in the shared communication system, in accordance with the present invention.

FIG. 6 is a flow chart for use in a communication unit of the second group of communication units 107–109. The flow chart of FIG. 6 can be implemented as a computer program stored in memory or other computer-readable medium and executed by a microprocessor, or other suitable processing means, within a communication unit of the second group 107–109. The communication unit sends a request for resources via a Packet Random Access Procedure (PRAP) slot at Block 160; the PRAP slot will be discussed in more detail below. At Block 162, a data channel update message is received via a time slot of the data channel. If a communication unit has just been turned on, or was unable to receive the data channel update message, for example due to channel errors, the communication unit must typically wait until receiving the next data channel update message before continuing to Block 164.

As described above, the data channel update message includes an allocation profile which enables the communication unit to determine, at Block 164, a portion of time slots now allocated to the data channel for the communication unit. The communication unit determines the time slots by examining the state of the bits in the allocation profile bitmap of FIG. 6; since the bits indicate the number of allocated slots, this is typically performed by counting the number of bits in the bitmap.

If necessary (i.e., if a data message is input at the communication unit data interface), the communication unit may transmit a message at Block 166 using the data channel as defined by the allocation profile included in the data channel update message. At Decision Block 168, it is determined whether a second data channel update message is scheduled. The update interval included in the data channel update message received at Block 162 can specify a period of time until the occurrence of the next data channel update message. When that period of time expires, a second data channel update message is expected at Block 162. Alternately, if the channel update message received in Block 162 indicates that a second data channel update message should not be expected. In order to detect a future data channel update message, the communication unit will have to monitor the time slots on the communication resource 110. Decision Block 169 ensures that the flow of FIG. 5 is repeated every time data is to be transmitted.

FIG. 7 is a time line illustrating usage of a data channel update message in accordance with an example. A series of four frames 190 established by an outbound portion of the communication resource 110 is illustrated. Each frame 190 comprises six time slots per frame, although other numbers of time slots per frame are acceptable. In the initial frame shown in FIG. 7, a first time slot, labeled V1, is allocated to a communication unit in the first group 104–106 (e.g., a voice call) and a second time slot 194 is reserved as a pad slot. The remaining third through sixth time slots comprise a data channel 192.

During the third slot of the first frame, a request for another voice call from a second communication unit of the first group 104–106 is received by the central controller 101, as shown. Responsive to this request a data channel update message 196 is transmitted by the central controller 101 during the third frame. This data channel update message 196 contains a new allocation profile indicating to the second group 107–109, in this example, that only the last three time slots of each subsequent frame now comprise the data channel 199. After transmitting the data channel update message 196, the central controller 101 allocates the second time slot, now labeled V2, to service the request received during the first frame. Note that the second time slot was a reserved slot 194 in previous frames. The central controller 101, as a result of reallocating the second time slot, designates, for example, the third time slot 198 as a reserved time slot.

In this manner, time slots are dynamically allocated in response to constantly changing system requirements, while requiring only a minimal amount of overhead. Use of the update interval allows communication units to determine when the next update of the data channel is scheduled to occur.

The present invention provides a means for RF training of RF transmitters used in shared communication systems that utilize dynamic channel allocation, such as a wireless TDM communication system, in a manner that allows training in near-continuous transmission modes, such as 6:6, while minimizing the negative effects of battery drainage and RF interference or "splatter" caused by RF training. Due to the increased data transmission rates afforded by modern systems, the training interval for the RF; transmitter and when "real" versus "pseudo" training will occur needs to be dynamically defined. As mentioned previously, full training has the disadvantage that during the phase portion of the training while the transmitter is determining the required amount of attenuation to use, the RF PA of the transmitter may saturate, causing RF interference on adjacent data channels. Additionally, real training is to be minimized because it causes the RF transmitter to consume more battery power than under normal operating conditions.

Therefore, according to the present invention, there are two types of RF training, both consisting of phase and amplitude training steps, that can occur during each allocated transmission slot. So-called "real training", or "full training" is performed during an initial transmission slot of a dynamically defined training interval when the subscriber unit containing the RF transmitter requests a needed portion of the fixed network equipment (FNE) communication resources and for conditions requiring updated real training, such as when the frequency or output power of the RF transmitter changes; "pseudo training" is performed during the other slots of the training interval. The advantages of performing pseudo training instead of real training are that pseudo training reduces the use of battery power and does not cause the RF PA of the RF transmitter to saturate and generate RF interference on adjacent communication channels, thereby eliminating the "splatter" often associated with such interference.

Although the use of real and pseudo training is known, the present invention, by performing "real training" only. once during a dynamically changing training interval, greatly reduces the amount of "real training" that occurs, thus minimizing the problems associated with frequent training. Moreover, because real training is performed at the beginning of the interval training during the initial transmission slot, there is sufficient time for the training results to be processed prior to subsequent transmission slots of the RF transmitter.

One of the communication units 107–109 containing the RF transmitter to be trained makes a request of some resources via a single, in-bound slot called the Packet Random Access Procedure (PRAP) layer 2 (data link layer) protocol, the "PRAP slot." The resources are needed for normal communication purposes. This request is transmitted by the communications unit to the base station 102. The request is received by central controller 101 which determines slot allocation and transmits a data channel update message to the SU via the base station 102, as discussed above in conjunction with Blocks 150–154 of FIG. 4. In the preferred embodiment, the PRAP slot is an initial transmission slot of a training interval and is preferably has a duration one-half as long as a regular, non-PRAP slot. Thus, assuming a regular training interval of 200 slots, with each transmission slot being 15 mS in duration, the initial, PRAP slot would preferably be 7.5 mS in duration. Assuming 90 mS between the PRAP slot and the first allocated data slot made available in response to the PRAP request, real training on the PRAP slot leaves sufficient time to process the training results and adjust the RF transmitter prior to the first and subsequent allocated data slots.

The present invention utilizes a training monitoring algorithm to control the RF training of the RF transmitter and ensure that RF training is performed in a manner in conformity with the above description. As previously described, because the packet data channel (PCH) communication resource is based on dynamic channel allocation within a variable frame length, the fixed network equipment (FNE) base station must tell each communication unit, such as a subscriber unit (SU), how many slots it is allowed to transmit. This information is contained in the data channel update message in the PCH at the beginning of every frame. The communication unit can transmit for any number of frames, as allocated by the FNE, until it has no more data to transmit. Also, because the communication unit knows how many slots it has transmitted (this information is passed to the controller 126), the algorithm can adaptively determine how often to perform "real training." The interleave of the packet channel is used to determine how often real training is to be performed.

FIGS. 8–14 that follow illustrate this training monitoring algorithm of the present invention. It is understood that the methodology of these flows can be implemented as a computer program stored in memory or other computer-readable medium and executed by a microprocessor, or other suitable processing means, within the RF transmitter being trained. The training monitoring algorithm of FIGS. 8 and 9 requires that the communication unit having the RF transmitter to be trained has requested an allocation of a portion of the available time slots of a communication resource; this request is made during an initial transmission slot, the PRAP slot, of the training interval. The training interval has a frame length defined by the number of transmission slots of the training interval. The controller 101 has sent a data channel update message that is received by the requesting communication unit, which contains information about the number of slots of the packet data channel that have been allocated to the communication unit.

Figure 8:
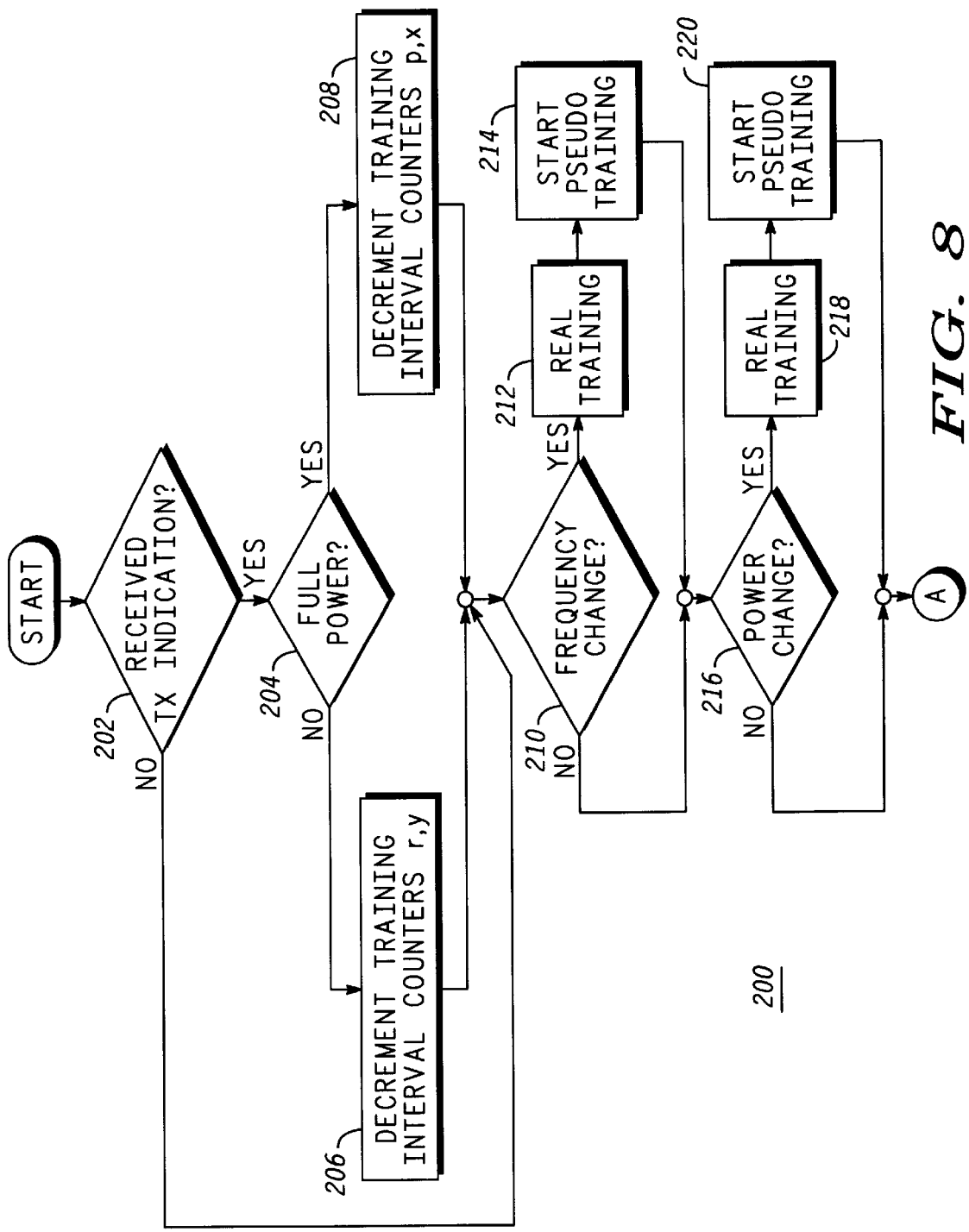
FIG. 8 is a flow chart of an overall methodology of a training monitoring algorithm used in the RF transmitter, in accordance with the present invention.
Figure 9:
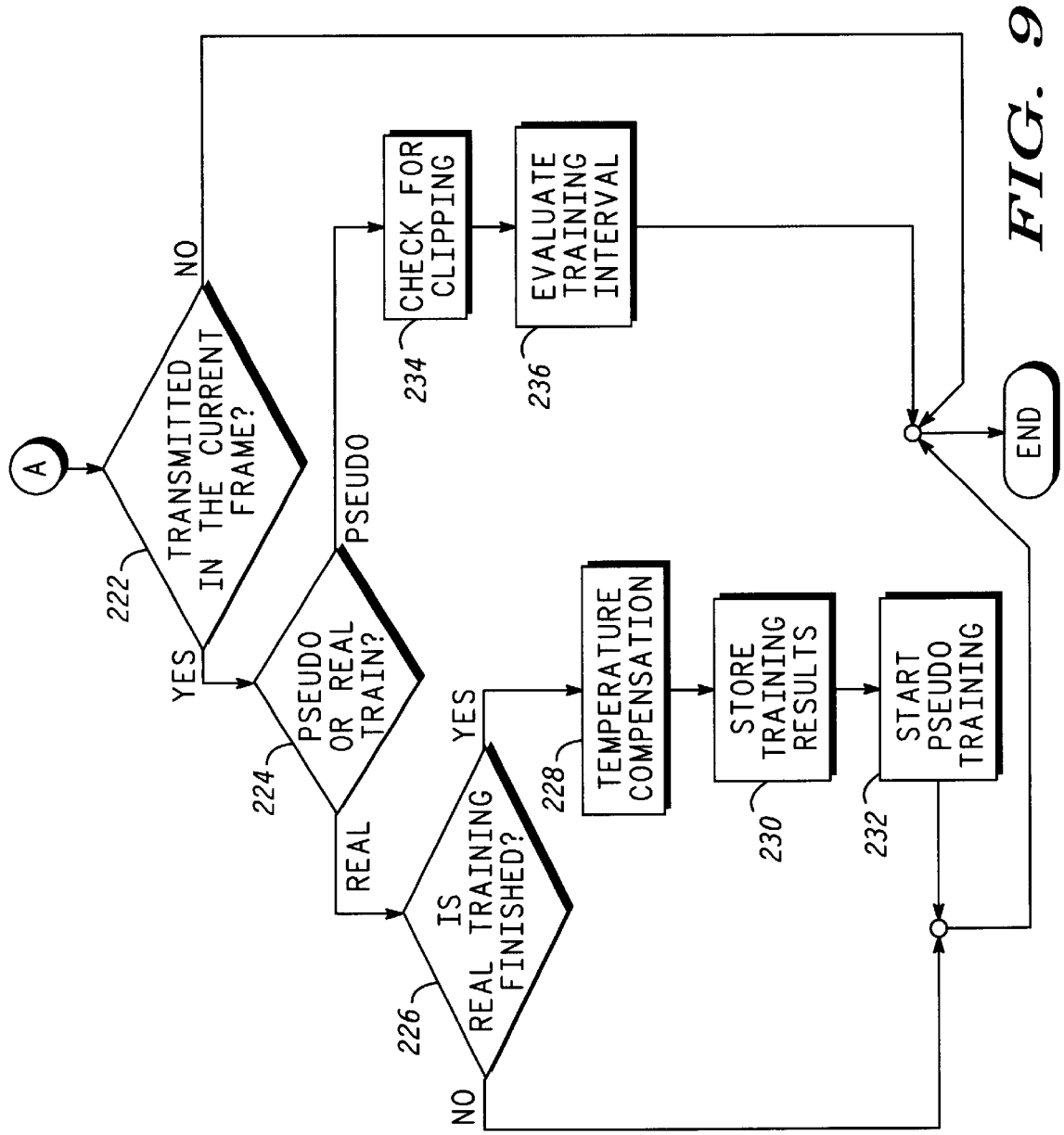
FIG. 9 is a waveform illustrating full (real) training and pseudo training of the RF transmitter, in accordance with the present invention.

Referring now to FIGS. 8 and 9, the flow chart 200 of the overall methodology of the training monitoring algorithm, in accordance with the present invention, is shown. At Decision Block 202; the inquiry is whether a controller 12 of the communication unit 120 of interest has received a transmission indication from the RF transmitter 128. If yes, then at Decision Block 204, the inquiry is whether the RF transmitter 128 is operating in a full power mode or a cut-back power mode. The full-power mode is indicated when the RF transmitter 128 has 0 dB of forward attenuation. The cut-back power mode is indicated when the forward attenuation is greater than 0 dB. If the RF transmitter is operating in the full power mode, then at Block 208 a first full-power training interval counter having a value p and a second full-power training interval counter having a value x are decremented. If, however, the RF transmitter 128 is operating in the cutback mode then a first cut-back power training interval counter having a value r and a second cut-back power training interval counter having a value y are decremented at Block 206. As will become clear during the discussion of FIG. 14, the first full-power training interval counter is the full-power mode counter associated with performing training of the RF transmitter more often and is indicated when the number of slots allocated in the PCH is greater than the number of slots of a base interleave, such as 3:1 or 6:1 transmission modes. The second full-power training interval counter is the full-power mode counter associated with training the RF transmitter according to the normal training interval and is indicated when the number of slots allocated in the PCH is not greater than the number of slots of the base interleave. The first cut-back power training interval counter is the cut-back mode counter associated with more frequent training of the RF transmitter and is indicated when the number of slots allocated in the PCH is greater than the number of slots of the base interleave. The second cut-back power training interval counter is the cut-back mode counter associated with training the RF transmitter 128 according to the normal training interval and is indicated when the number of slots allocated in the PCH is not greater than the number of slots of the base interleave. The four counter values p, x, r, and y need not be equal and may in fact be representative of different training intervals if so desired.

After the power mode of the RF transmitter 128 has been ascertained, the inquiry at Decision Block 210 is whether the operating frequency of the RF transmitter has changed. If so, then full (real) training of the RF transmitter is performed at Block 212, followed by pseudo training of the transmitter at Block 214. At Decision Block 216, a determination is made about whether there has been a change in the power mode of the RF transmitter. If so, full training of the RF transmitter at Block 218 followed by pseudo training of the RF transmitter at Block 220 is performed.

Figure 10:
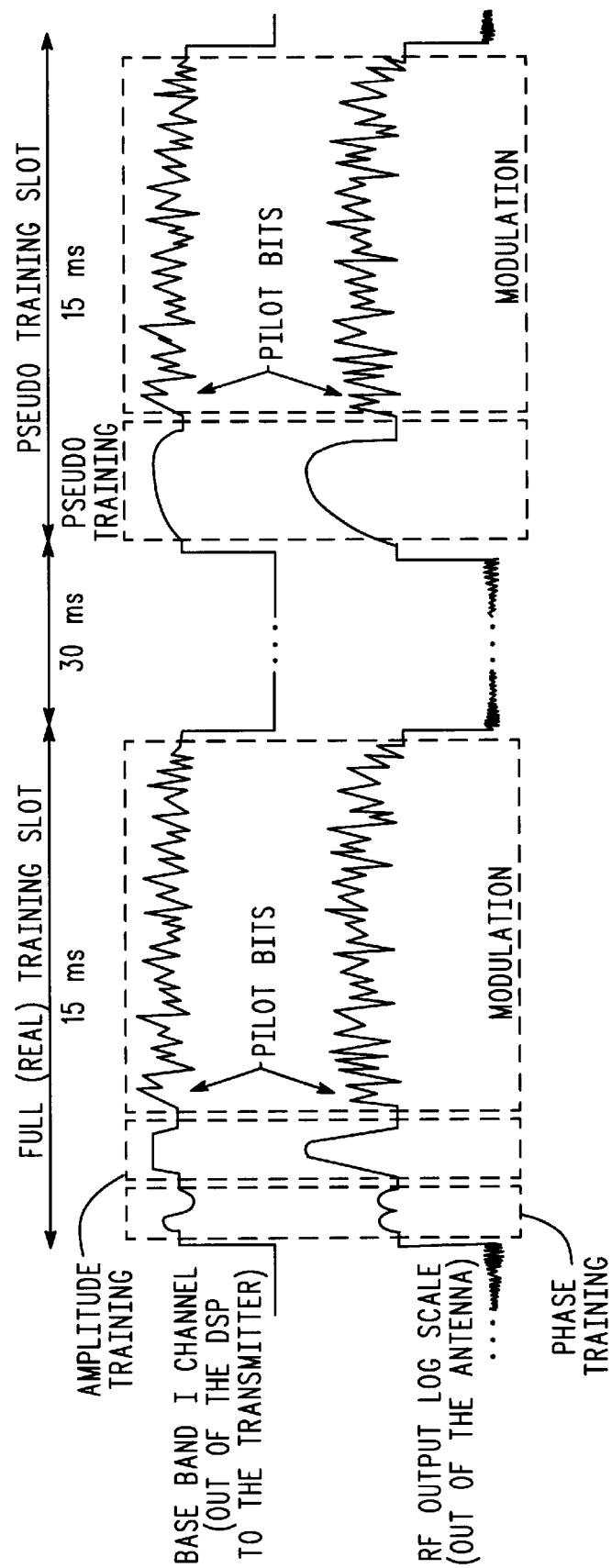
FIG. 10 is a flow chart illustrating the full (real) training, in accordance with the present invention.

An illustration of full training and pseudo training is provided by FIGS. 10–12. It can be seen in FIG. 10 that during full or real training, the RF transmitter is provided with a phase training waveform followed by an amplitude training waveform to determine optimal phase and attenuation values, respectively, of the transmitter. The full sequence of phase training followed by amplitude training is performed on the PRAP slot of the training interval in order to complete training with plenty of time to make the training results available to adjust the RF transmitter before the next allocated data slot. This is illustrated in Blocks 242–244 of FIG. 11. Pseudo training occurs at each subsequent allocated data slot. During pseudo training a ramp waveform is substituted in place of the phase and amplitude training sequence and provided to the RF transmitter. This is illustrated in FIG. 10 and in Block 252 of FIG. 12. The advantages of pseudo training is that pseudo training does not waste battery power and doesn't cause the RF PA of the RF transmitter to saturate and cause RF interference on adjacent communication channels, thereby eliminating the "splatter" often associated with such interference. Also performed at the time of pseudo training is the resetting of the first and second full-power training interval counters p, x and the first and second cut-back power training interval counters r, y to their maximum values, ready to start the decrementing process anew. Pseudo training is accomplished on the remainder of the transmission slots of the training interval, unless some change in power, frequency or temperature requires that full training be performed again, as will be seen.

Figure 15:
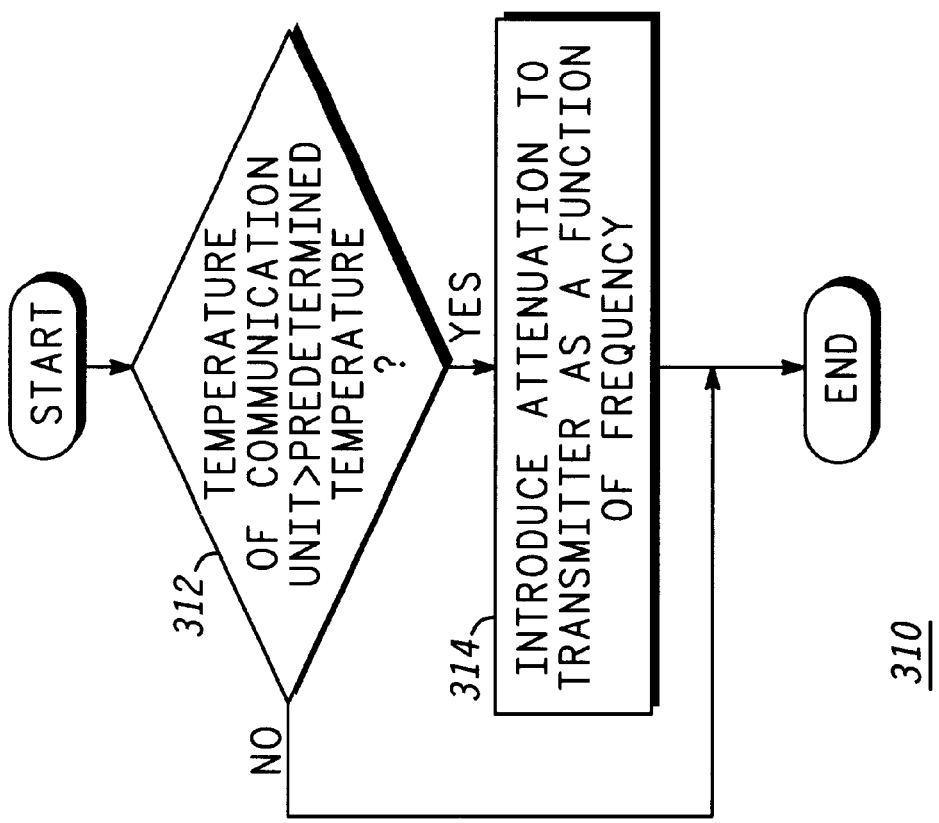
FIG. 15 is a flow chart illustrating temperature compensation of training results in the RF transmitter, in accordance with the present invention.

Referring back to FIG. 9, the next inquiry at Decision Block 222 is whether the RF transmitter has transmitted during the current frame. If so, then at Decision Block 224, whether real training or, pseudo training of the RF transmitter is being performed must be determined. If answer is real training, then a determination must be made at Block 226 whether the training sequence has been completed. If the training has been completed, then temperature compensation of the full training results is performed at Block 228 in a conventional manner. The flow chart 310 of FIG. 15 illustrates the process of compensating the training results for temperature; the results need only be compensated if the temperature of the RF transmitter is running hot. At Decision Block 312, the inquiry is whether the temperature of the transmitter has exceeded a predetermined temperature. If so, then attenuation is introduced to the real training results in accordance with the frequency of the RF transmitter at Block 314; although not linear in scale, generally the higher the frequency of the RF transmitter 128, the greater the attenuation that is introduced in a manner known in the art. At Block 230 of FIG. 9, the training results, attenuated or not, are stored in a memory of the communication device to adjust the operational settings of the transmitter. At Block 232, pseudo training of the RF transmitter is performed on the next allocated transmission slot of the training interval and performed for the remainder of the training interval unless there is some change in temperature, frequency or power of the transmitter operating environment.

If the answer to the inquiry at Decision Block 224 is that pseudo training of the RF transmitter 128 is being performed, the flow continues to Block 234 where it is determined whether the RF transmitter is clipping an output waveform of the transmitter. Referring to FIG. 13, it can be seen that clipping is detected by monitoring a clip bit of the transmitter at Block 262 as per existing art. If clipping is detected, then it is likely that data errors have occurred during transmission, so the next allocated slot is rescheduled to be a real training slot, as opposed to a pseudo training slot, and real training of the RF transmitter occurs at Block 264 and the training interval is reset. This is followed by pseudo training for each remaining allocated transmission slot of the new training interval at Block 266.

Referring again to FIG. 9, at Block 236 the adequacy of the training interval is evaluated to determine how often to "real" train the RF transmitter. As will be shown, the interleave of the packet channel determines how often real training should occur. The length of the training interval will be shortened to cause more frequent real or full training of the RF transmitter if the number of slots allocated to the communication unit is greater than the number of slots allocated to a base interleave. The details of Block 236 are provided by flow chart 270 of FIG. 14. It is understood that the flow of FIGS. 8 and 9 is repeated, preferably endlessly, to provide the desired training monitoring function of the present invention.

Figure 14:
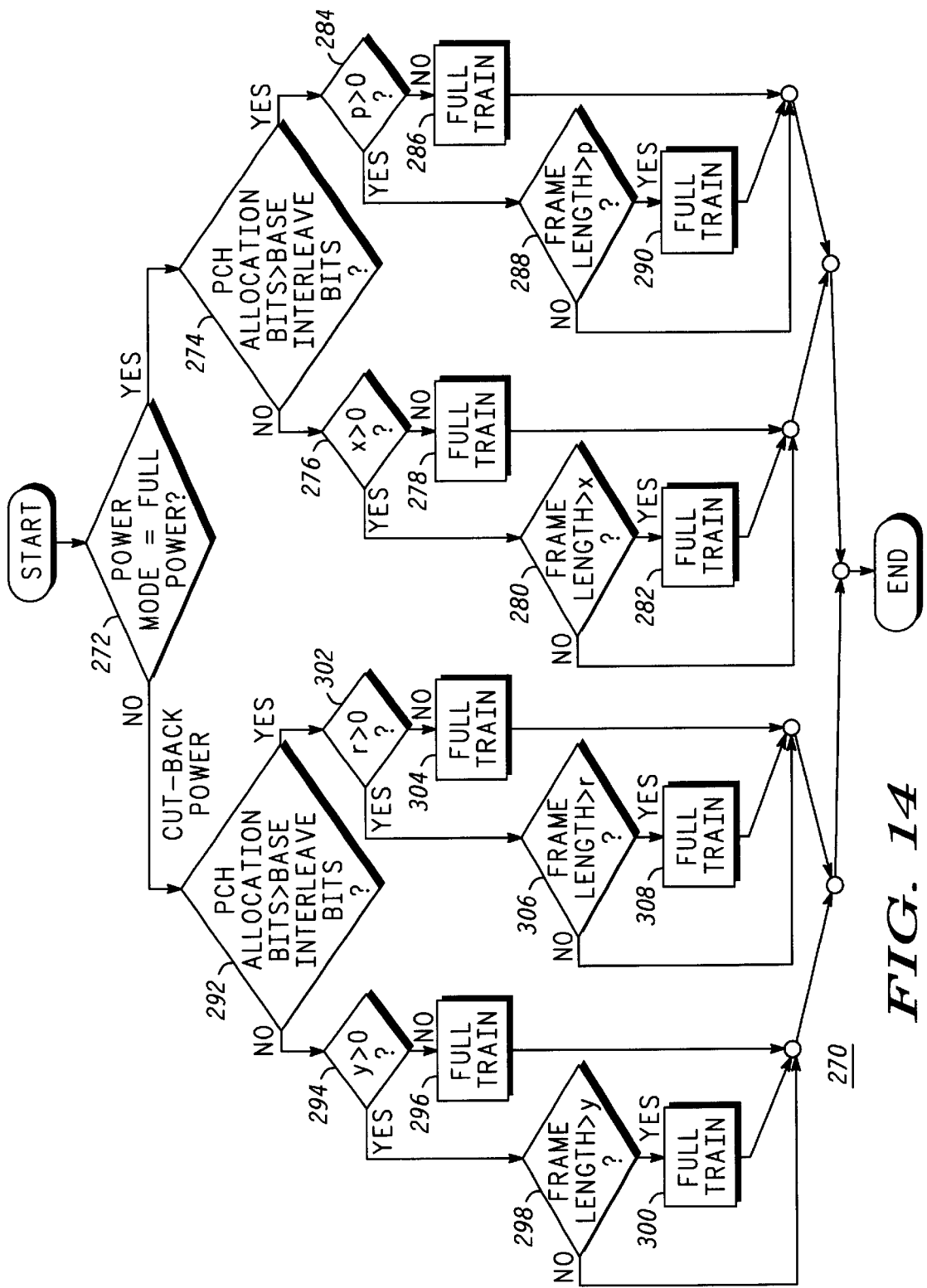
FIG. 14 is a flow chart illustrating temperature compensation of full training results in the RF transmitter, in accordance with the present invention.

Referring now to FIG. 14, the inquiry at Decision Block 272 is whether the RF transmitter is in the full-power mode. If. the RF transmitter is operating in the full power mode, then the flow goes to Decision Block 274 where a determination is made whether the number of slots allocated to the communication unit is greater than the number of slots allocated to the base interleave. Suppose, for example, that the base interleave of the system is 3:1 (it could also be 6:1); the inquiry at Decision Block 274, then, is whether the allocation bit count provided to the communication unit from the central controller, and as indicated in the variable bitmap of the allocation profile 182 of FIG. 5, is greater than the bit count associated with the 3:1 base interleave. If the answer is yes, then more frequent training than the training interval of the base interval is indicated. Thus, for example, if the training interval is normally 200 slots, this may be changed to 100 slots. The inquiry at Decision Block 284 is whether the value p of the first full-power training interval counter is greater than a minimum value of the first full-power training interval counter (usually zero). If not, then full-training of the transmitter immediately commences on the next PRAP slot at Block 286. If, however, p is greater than its minimum value, then the inquiry at Decision Block 288 is whether the frame length of the training interval is greater than p. If it is, then full training commences at Block 290.

Considering again Decision Block 274, if the number of slots allocated to the communication unit is not greater than the number of slots allocated to the base interleave, then the flow goes to Decision Block 276 to determine whether the value x of the second full-power training interval counter is greater than its minimum value (also usually zero). If x is greater than 0, it is compared to the frame length of the training interval at Decision Block 280. If the frame length is greater than x, then full training is performed on the next available transmission slot at Block 282.

The above methodology for the full power mode is mirrored at Blocks 292–308 when the answer to Decision Block 272 indicates that the RF transmitter is operating in the cut-back mode.

While the invention has been particularly shown and described with reference to one or more preferred embodiments, it will be clearly understood by those of ordinary skill in the art that the invention is not so limited. Numerous modifications, changes, alternatives, permutations, variations, substitutions and equivalents may be made therein without departing from the spirit and scope of the invention. For instance, while the preferred embodiment discusses training of an RF transmitter, one of ordinary skill in the art will recognize that the invention is applicable to any transmitter within a shared communication system that must be trained during a training interval. Moreover, in addition to wireless TDM systems, the present invention is applicable to other data protocols and cellular communication systems, including Group Special Mobile Pocket Radio Service (GPRS) and cellular digital packet data (DCPD).

What is claimed is:

1. In a shared communication system comprising a plurality of communication units and a central controller that allocates a plurality of time slots of a data channel among the plurality of communication units, a method for controlling training of at least a first transmitter of a communication unit of the plurality of communication units of the shared communication system that is capable of near-continuous transmission of data, said method comprising:

the communication unit requesting allocation of a portion of the plurality of time slots of the communication resource via an initial transmission slot of a plurality of transmission slots of a training interval, said training interval having a length defined by the plurality of transmission slots;

the communication unit receiving a data channel update message from the central controller containing a number of slots of the plurality of slots of the data channel allocated to the communication unit;

if a controller of the communication unit receives a transmission indication from the transmitter, determining whether the transmitter is operating in a full-power mode or a cut-back power mode, further comprising:

if the transmitter is operating in the full power mode, decrementing a first full-power training interval counter and decrementing a second full-power training interval counter;

if the transmitter is operating in the cut-back power mode, decrementing a first cut-back power training interval counter and decrementing a second cut-back power training interval counter;

if the operating frequency of the transmitter has changed, further comprising:

performing real training on the transmitter during a next allocated transmission slot of the plurality of transmission slots of the training interval; and performing pseudo training oh the transmitter during subsequent slots of the plurality of transmission slots of the training interval and resetting the first and second full-power training interval counters and the first and second cut-back power training interval counters;

if the transmitter transmitted during a current frame, further comprising:

determining whether real training or pseudo training is being performed on the transmitter during the training interval;

if real training of the transmitter is complete and real training results generated, further comprising:

performing temperature compensation based on the real training results;

storing the real training results in a memory of the communication unit to adjust operation of the transmitter; and performing pseudo training of the transmitter during a next allocated transmission slot of the training interval;

if pseudo training of the transmitter is being performed, further comprising:

detecting whether the transmitter is clipping an output waveform of the transmitter and performing real training of the transmitter during the next allocated transmission slot upon detection of clipping by the transmitter;

performing pseudo training of the transmitter; and adjusting the length of the training interval to train more often if the number of slots allocated to the communication unit is greater than the number of slots allocated to a base interleave.

2. The method in accordance with claim 1, wherein performing real training on the transmitter comprises:

supplying the transmitter with a phase training waveform; and supplying the transmitter with an amplitude training waveform.

3. The method in accordance with claim 1, wherein performing pseudo training on the transmitter comprises supplying the transmitter with a pseudo waveform during the subsequent slots.

4. The method in accordance with claim 1, wherein performing temperature compensation on the real training results comprises introducing attenuation to the real training results as a function of the frequency of the transmitter to generate attenuated real training results if the temperature of the communication unit is above a predetermine temperature.

5. The method in accordance with claim 1, wherein detecting whether the transmitter is clipping condition is accomplished by monitoring a clip bit of the transmitter.

6. The method in accordance with claim 1, wherein adjusting the length of the training interval to train more often if the number of slots allocated to the communication unit is greater than the number of slots allocated to a base interleave comprises:

if the transmitter is operating in the full power mode further comprising:

determining whether the number of slots allocated to the communication unit is greater than the number of slots allocated to the base interleave;

if the number of slots allocated to the communication unit is greater than the number of slots allocated to the base interleave, further comprising:

determining whether the first full-power training interval counter is greater than a minimum value of the first full-power training interval counter;

if the first full-power training interval counter is greater than the minimum value of the first full-power training interval counter, further comprising:
  determining whether the frame length of the training interval is greater than the first full-power training interval counter; and
  if the frame length of the current frame is greater than the first full-power training interval counter, performing real training of the transmitter during the next Packet Random Access Procedure (PRAP) slot of the training interval;
if the first full-power training interval counter is not greater than the minimum value of the first full-power training interval counter, performing real training of the transmitter during the next PRAP transmission slot of the training interval;
if the number of slots allocated to the communication unit is not greater than the number of slots allocated to the base interleave, further comprising:
  determining whether the second full-power training interval counter is greater than a minimum value of the second full-power training interval counter;
  if the second full-power training interval counter is greater than the minimum value of the second full-power training interval counter, further comprising:
    determining whether the frame length of the current frame is greater than the second full-power training interval counter; and
    if the frame length of the current frame is greater than the second full-power training interval counter, performing real training of the transmitter during the next PRAP slot of the training interval;
  if the second full-power training interval counter is not greater than the minimum value of the second full-power training interval counter, performing real training of the transmitter during the next PRAP slot of the training interval; and
if the transmitter is operating in the cut-back power mode further comprising:
  determining whether the number of slots allocated to the communication unit is greater than the number of slots allocated to the base interleave;
  if the number of slots allocated to the communication unit is greater than the number of slots allocated to the base interleave, further comprising:
    determining whether the first cut-back power training interval counter is greater than a minimum value of the first cut-back power training interval counter;
    if the first cut-back power training interval counter is greater than the minimum value of the first cut-back power training interval counter, further comprising:
      determining whether the frame length of the current frame is greater than the first cut-back power training interval counter; and
      if the frame length of the current frame is greater than the first cut-back power training interval counter, performing real training of the transmitter on the next available transmission slot of the training interval;
    if the first cut-back power training interval counter is not greater than the minimum value of the first cut-back power training interval counter, performing real training of the transmitter during the next PRAP slot of the training interval;
  if the number of slots allocated to the communication unit is not greater than the number of slots allocated to the base interleave, further comprising:
    determining whether the second cut-back power training interval counter is greater than a minimum value of the second cut-back power training interval counter;
    if the second cut-back power training interval counter is greater than the minimum value of the second cut-back power training interval counter, further comprising:
      determining whether the frame length of the current frame is greater than the second cut-back power training interval counter; and
      if the frame length of the current frame is greater than the second cut-back power training interval counter, performing real training of the transmitter during the next PRAP slot of the training interval;
    if the second cut-back power training interval counter is not greater than the minimum value of the second cut-back power training interval counter, performing real training of the transmitter during the next PRAP slot of the training interval.

7. In a shared communication system comprising a plurality of communication units and a central controller that allocates a plurality of time slots of a data channel among the plurality of communication units, a computer program recorded in machine readable memory for controlling training of at least a first transmitter of a communication unit of the plurality of communication units of the shared communication system that is capable of near-continuous transmission of data, said program comprising:
  instructions for the communication unit requesting allocation of a portion of the plurality of time slots of the communication resource via an initial transmission slot of a plurality of transmission slots of a training interval, said training interval having a length defined by the plurality of transmission slots;
  instructions for the communication unit receiving a data channel update message from the central controller containing a number of slots of the plurality of slots of the data channel allocated to the communication unit;
  if a controller of the communication unit receives a transmission indication from the transmitter, instructions for determining whether the transmitter is operating in a full power mode or a cut-back power mode, further comprising:
    if the transmitter is operating in the full power mode, instructions for decrementing a first full-power training interval counter and decrementing a second full-power training interval counter;
    if the transmitter is operating in the cut-back power mode, instructions for decrementing a first cut-back power training interval counter and decrementing a second cut-back power training interval counter;
    if the operating frequency of the transmitter has changed:
      instructions for performing real training on the transmitter during a next allocated slot of the plurality of transmission slots of the training interval; and
      instructions for performing pseudo training on the transmitter during subsequent slots of the plurality of transmission slots of the training interval and resetting the first and second full-power training interval counters and the first and second cut-back power training interval counters;

if the transmitter transmitted during a current frame, further comprising:
  instructions for determining whether real training or pseudo training is being performed on the transmitter during the training interval;
  if real training of the transmitter is complete and real training results are:
    instructions for performing temperature compensation on the real training results;
    instructions for storing the real training results in a memory of the communication unit to adjust operation of the transmitter; and
    instructions for performing pseudo training of the transmitter on a next allocated transmission slot of the training interval;
  if pseudo training of the transmitter is being performed:
    instructions for detecting whether the transmitter is clipping an output waveform of the transmitter and performing real training of the transmitter for the next allocated transmission slot upon detection of clipping by the transmitter;
    instructions for performing pseudo training of the transmitter; and
    instructions for adjusting the length of the training interval to train more often if the number of slots allocated to the communication unit is greater than the number of slots allocated to a base interleave.

8. The media in accordance with claim 7, wherein performing real training on the transmitter comprises:
  instructions for supplying the transmitter with a phase training waveform; and
  instructions for supplying the transmitter with an amplitude training.

9. The media in accordance with claim 7, wherein performing pseudo training on the transmitter comprises instructions for supplying the transmitter with a pseudo waveform during the subsequent slots.

10. The media in accordance with claim 7, wherein performing temperature compensation on the real training results comprises instructions for introducing attenuation to the real training results as a function of the frequency of the transmitter to generate attenuated real training results if the temperature of the communication unit is above a predetermine temperature.

11. The media in accordance with claim 7, wherein detecting whether the transmitter is clipping condition is accomplished by instructions for monitoring a clip bit of the transmitter.

12. The media in accordance with claim 7, wherein adjusting the length of the training interval to train more often if the number of slots allocated to the communication unit is greater than the number of slots allocated to a base interleave comprises:
  if the transmitter is operating in the full power mode further comprising:
    instructions for determining whether the number of slots allocated to the communication unit is greater than the number of slots allocated to the base interleave;
    if the number of slots allocated to the communication unit is greater than the number of slots allocated to the base interleave, further comprising:
      instructions for determining whether the first full-power training interval counter is greater than a minimum value of the first full-power training interval counter;
      if the first full-power training interval counter is greater than the minimum value of the first full-power training interval counter, further comprising:
        instructions for determining whether the frame length of the training interval is greater than the first full-power training interval counter; and
        if the frame length of the current frame is greater than the first full-power training interval counter, instructions for performing real training of the transmitter during the next Packet Random Access Procedure (PRAP) available transmission slot of the training interval;
      if the first full-power training interval counter is not greater than the minimum value of the first full-power training interval counter, instructions for performing real training of the transmitter during the next PRAP slot of the training interval;
    if the number of slots allocated to the communication unit is not greater than the number of slots allocated to the base interleave, further comprising:
      instructions for determining whether the second full-power training interval counter is greater than a minimum value of the second full-power training interval counter;
      if the second full-power training interval counter is greater than the minimum value of the second full-power training interval counter, further comprising:
        instructions for determining whether the frame length of the training interval is greater than the second full-power training interval counter; and
        if the frame length of the current frame is greater than the second full-power training interval counter, instructions for performing real training of the transmitter during the next PRAP slot of the training interval;
      if the second full-power training interval counter is not greater than the minimum value of the second full-power training interval counter, instructions for performing real training of the transmitter during the next PRAP slot of the training interval; and
  if the transmitter is operating in the cut-back power mode further comprising:
    instructions for determining whether the number of slots allocated to the communication unit is greater than the number of slots allocated to the base interleave;
    if the number of slots allocated to the communication unit is greater than the number of slots allocated to the base interleave, further comprising:
      instructions for determining whether the first cut-back power training interval counter is greater than a minimum value of the first cut-back power training interval counter;
      if the first cut-back power training interval counter is greater than the minimum value of the first cut-back power training interval counter, further comprising:
        instructions for determining whether the frame length of the current frame is greater than the first cut-back power training interval counter; and
        if the frame length of the current frame is greater than the first cut-back power training interval counter, instructions for performing real training of the transmitter during the next PRAP slot of the training interval;

if the first cut-back power training interval counter is not greater than the minimum value of the first cut-back power training interval counter, instructions for performing real training of the transmitter on the next available transmission slot of the training interval;

if the number of slots allocated to the communication unit is not greater than the number of slots allocated to the base interleave, further comprising:

instructions for determining whether the second cut-back power training interval counter is greater than a minimum value of the second cut-back power training interval counter;

if the second cut-back power training interval counter is greater than the minimum value of the second cut-back power training interval counter, further comprising:

instructions for determining whether the frame length of the current frame is greater than the second cut-back power training interval counter; and if the frame length of the training interval is greater than the second cut-back power training interval counter, instructions for performing real training of the transmitter during the next PRAP slot of the training interval;

if the second cut-back power training interval counter is not greater than the minimum value of the second cut-back power training interval counter, instructions for performing real training of the transmitter during the next PRAP slot of the training interval.

* * * * *